C. S. BEGGS.
TRUCK FOR STRAW SPREADERS.
APPLICATION FILED DEC. 12, 1914.

1,180,562.

Patented Apr. 25, 1916.
2 SHEETS—SHEET 1.

Witnesses:
L. B. Graham
T. Colson

Inventor:
Charles S. Beggs,
By Brown, Nissen & Sprinkle
Att'ys.

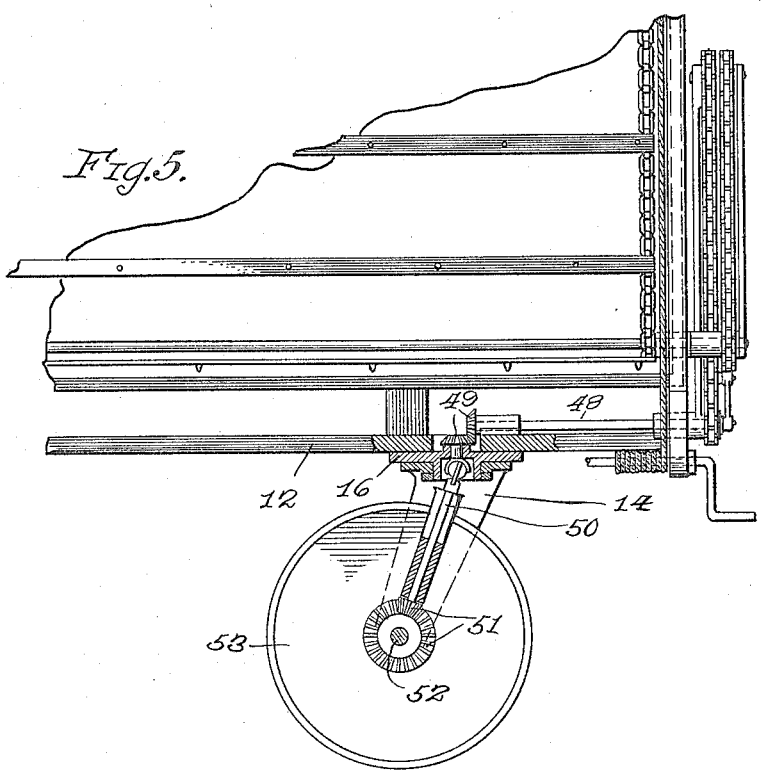

UNITED STATES PATENT OFFICE.

CHARLES S. BEGGS, OF ASHLAND, ILLINOIS.

TRUCK FOR STRAW-SPREADERS.

1,180,562. Specification of Letters Patent. Patented Apr. 25, 1916.

Application filed December 12, 1914. Serial No. 876,774.

*To all whom it may concern:*

Be it known that I, CHARLES S. BEGGS, a citizen of the United States, residing at Ashland, in the county of Cass and State of Illinois, have invented certain new and useful Improvements in Trucks for Straw-Spreaders, of which the following is a specification.

My invention relates to trucks for unloading and distributing devices, and has for its object the provision of a simple device of this character which is particularly adapted for use in unloading materials such as straw, leaves, hay and other similar substances, and spreading such materials evenly over the ground or other surface in an efficient manner.

A further object is to provide a device of the character mentioned sufficiently narrow to permit it to be drawn through ordinary gates and ways when drawn lengthwise, and having its ground wheels pivotally mounted in a manner to permit it to be drawn sidewise during the unloading operation, in order to distribute the materials over a wide strip of ground.

Other objects will appear hereinafter.

The invention consists in substantially the combinations and arrangement of parts hereinafter described and claimed, and will be best understood by referring to the accompanying drawings forming a part of this specification and in which—

Figure 1:
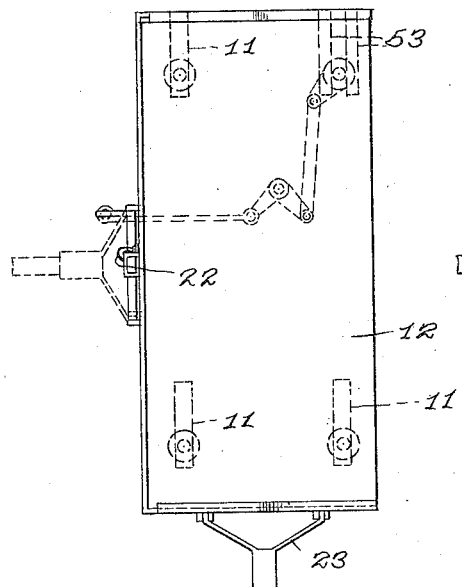
Figure 3:
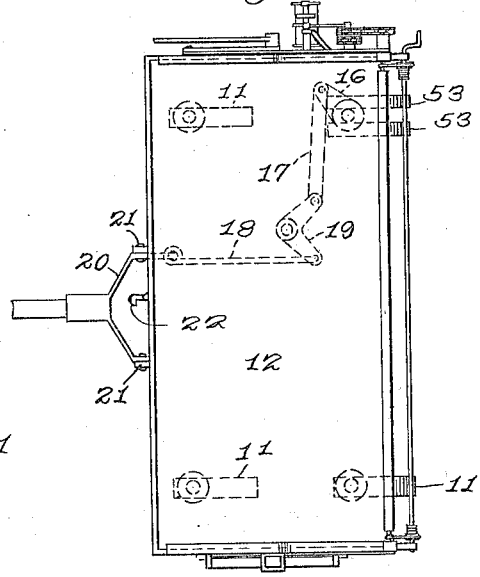
Figure 2:
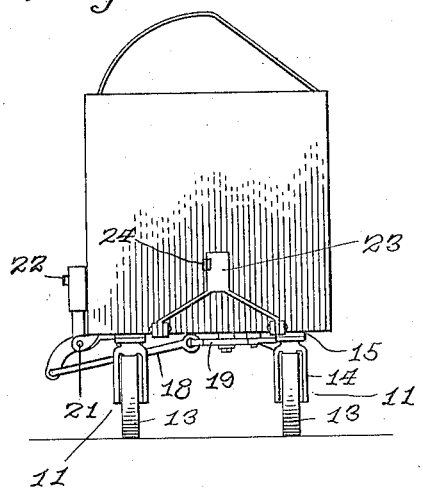
Figure 4:
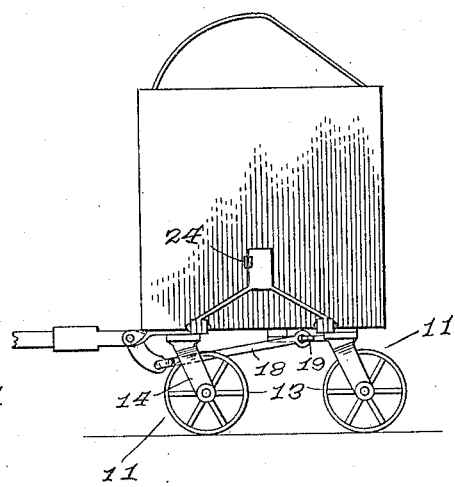

Figure 1 is a plan view illustrating the positions of the wheels in my device when adapted to be drawn lengthwise of the truck. Fig. 2 is an end elevation of the same. Fig. 3 is a top plan view of my device showing the wheels disposed to permit the device to travel sidewise of the truck. Fig. 4 is an end elevation of the same, and Fig. 5 is an enlarged fragmental view showing a means of taking power from one of the caster wheels.

My invention contemplates a truck adapted for conveying straw and other similar substances, from a stack, barn, or the like, to a field or other place where it is desired to distribute it. In such a device, it is desirable to form it in such a width that it may easily pass through ordinary gates and ways and be of a width to distribute a comparatively wide strip of straw at a time. In order to provide means for accomplishing this purpose, I pivot my ground wheels to the platform of the frame or rack so that the device may be drawn either longitudinally or sidewise of the rack. I preferably use three casters 11, similar in construction and of any approved design. These casters are secured to the under side of the platform 12 in any suitable manner, such as is done in ordinary practice. Each of the casters comprises a wheel 13, a yoke 14, and a base member 15, the latter being secured to the under side of the platform. The fourth caster is preferably provided with a lever 16 and the latter connected by means of connecting links 17 and 18 and bell crank 19, to a tongue member 20. The tongue member 20 is pivoted as at 21 to the side of the platform and is arranged so that when it is disposed in horizontal position the caster connected therewith will be disposed substantially as indicated in Fig. 3. By providing a means for controlling the swivel movement of one of the casters, I am enabled to control the direction of travel of the device. When it is desired to draw the device longitudinally of the platform, the tongue 20 is swung on its pivotal point to vertical position such as indicated in Figs. 1 and 2. When in this position, it is adapted to engage a catch 22 to lock the caster connected therewith. When it is desired to draw the device lengthwise of the platform, a hitch is made to the tongue 23 at one end of the platform. The tongue 23 is also provided with a catch 24 to lock it in vertical position when not in use. When mechanism requiring power to drive the same is to be used in connection with the truck, such power may be taken from the caster wheel connected with tongue 20. As a means for taking power from said caster wheel, I have shown a shaft 48 journaled in the frame and connected by bevel gears 49 with a shaft 50 which is connected by bevel gears 51 with the axle 52 of the caster wheel. The caster wheel from which power is to be taken preferably consists of two ground wheels 53 between which the shaft 50 and gears 51 are disposed to more equally balance the strains caused in driving shaft 50 and the moving parts connected therewith.

While I have illustrated and described the preferred form of construction, I do not desire to be limited to the precise details set forth, but desire to avail myself of variations and changes as come within the scope of the appended claims.

I claim:

1. A truck comprising a comparatively long and narrow frame; supporting wheels for the frame, each supporting wheel being a caster wheel swiveled to the frame; and means on the frame connected with one of the caster wheels adapted to hold said caster wheel in one position to facilitate guiding the truck when the latter is drawn longitudinally of the frame and to move said caster wheel and hold the latter in another position to facilitate guiding the truck when the latter is drawn laterally of the frame, all of the other casters being free to rotate on their swiveling axis.

2. In combination, a frame; casters supporting said frame; draft means pivoted to said frame and adapted to move vertically; and a connection between the draft means and certain of the casters adapted to change the direction of travel of the latter upon vertical movement of the draft means.

3. In combination, a comparatively long and narrow frame; supporting wheels for the frame, each wheel being a caster wheel and swiveled to the frame; a draft means at one side of the frame for drawing the latter laterally; a draft means at one end of the frame for drawing the latter longitudinally; and means for locking one of the caster wheels in positions to guide the directions of travel of the frame, each of the other caster wheels being free to rotate on its swiveling axis.

4. In combination, a comparatively long and narrow frame; supporting wheels for the frame, each wheel being a caster wheel and swiveled to the frame; a draft means at one side of the frame for drawing the latter laterally; a draft means at one end of the frame for drawing the latter longitudinally; a lever on the mounting of one of said caster wheels; an arm on one of the draft means; and a connection between said lever and arm whereby movement of the draft means having said arm thereon moves the caster wheel having the lever thereon to control the direction of travel of the frame.

5. In combination a frame; ground wheels supporting the frame and swiveled to the latter; a tongue pivoted to said frame; and a connection between one of the ground wheels and the tongue, permitting the latter to lock its connected ground wheel to travel in one direction when the tongue is in horizontal position and lock said ground wheel to travel in another direction when the tongue is in vertical position.

6. In combination a frame; ground wheels supporting the frame, and swiveled to the latter; a tongue pivoted to the frame; a connection between one of the ground wheels and the tongue permitting the latter to lock its connected ground wheel to travel laterally of the frame when the tongue is in horizontal position and lock said ground wheel to travel longitudinally of the frame when the tongue is in vertical position; and a hitching connection at the end of the frame adapted to move the truck longitudinally of the frame.

7. A truck comprising a frame comparatively long and narrow; supporting wheels for the frame each supporting wheel being a caster wheel and swiveled to the frame; a tongue pivoted to the end of the frame and adapted for use in drawing the truck longitudinally of the frame; a tongue pivoted for vertical movement to the side of the frame and adapted for use in drawing the truck laterally of the frame; an arm on the last-mentioned tongue; a lever pivoted to the frame; a connecting link connecting said lever with said arm; a lever on the mounting of one of the caster wheels adapted to control the direction of travel of the latter; and a connecting link connecting the lever pivoted to the frame with the lever on the mounting of said caster wheel.

8. In combination, a frame; ground wheels supporting said frame and pivoted to the latter for horizontal movement; a tongue pivoted to said frame; and a connection between said tongue and one of the ground wheels causing vertical movement of the tongue to move said ground wheels horizontally.

9. In combination, a frame; casters supporting said frame; an arm on one of said casters; a tongue pivotally connected to said frame and adapted to move vertically; and a catch on said frame adapted to engage and lock said tongue at one terminal of its pivotal movement.

10. In combination, a frame; casters supporting said frame, draft means pivoted to said frame; a connection connecting said draft means with one of said casters and adapted to control the direction of travel of the latter; a shaft journaled in said frame; and a gear connection between the caster connected to the draft means and said shaft adapted to transmit rotary movement to the latter from said caster.

11. In combination, a substantially rectangular frame; ground wheels swiveled to and supporting the frame; draft means at the side of the frame adapted to be used to pull the device laterally; draft means at the end of the frame adapted to be used to pull the device longitudinally; and a connection connecting one of the draft means with one of the ground wheels adapted to vary the direction of travel of the device upon vertical movement of the draft means.

12. In combination, a frame; a plurality of casters supporting the frame, one of said casters being provided with two spaced ground wheels; draft means pivoted to said frame; a connection connecting said draft means with the caster having the two spaced ground wheels and adapted to control the direction of travel of the last mentioned caster; a shaft journaled in the frame; and a connection between the two spaced ground wheels of the last mentioned caster and said shaft causing rotary movement of the ground wheels to rotate said shaft.

In testimony whereof I have signed my name to this specification, in the presence of two subscribing witnesses, on this 9th day of December, A. D. 1914.

CHARLES S. BEGGS.

Witnesses:
FRANK GRAFF,
U. J. SINCLAIR.

Copies of this patent may be obtained for five cents each, by addressing the "Commissioner of Patents, Washington, D. C."